(12) United States Patent  
Masuda

(10) Patent No.: US 6,394,215 B1  
(45) Date of Patent: May 28, 2002

(54) VEHICLE MOTIVE POWER TRANSMISSION STRUCTURE

(75) Inventor: Tomonori Masuda, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/538,401

(22) Filed: Mar. 29, 2000

(30) Foreign Application Priority Data

Mar. 31, 1999 (JP) .......................................... 11-093384  
Nov. 25, 1999 (JP) .......................................... 11-334216

(51) Int. Cl.$^7$ ................................................. B60K 5/00  
(52) U.S. Cl. ...................... 180/232; 180/274; 180/379  
(58) Field of Search ................................. 180/232, 274, 180/376, 379, 380, 784

(56) References Cited

U.S. PATENT DOCUMENTS

| | | | | |
|---|---|---|---|---|
| 3,869,016 A | * | 3/1975 | Astheimer | 180/73 R |
| 4,771,842 A | * | 9/1988 | Mihio et al. | 180/75.2 |
| 4,834,406 A | * | 5/1989 | Mukai et al. | 280/91 |
| 4,867,260 A | * | 9/1989 | Cameron et al. | 180/360 |
| 4,875,538 A | * | 10/1989 | Hodgson et al. | 180/379 |
| 5,562,179 A | * | 10/1996 | McAdam | 180/379 |
| 5,566,777 A | * | 10/1996 | Trommer et al. | 180/232 |
| 6,213,245 B1 | * | 4/2001 | Murata et al. | 180/377 |

FOREIGN PATENT DOCUMENTS

| | | | | |
|---|---|---|---|---|
| JP | 03229011 A | * | 10/1991 | F16C/3/02 |
| JP | 9-300996 | | 11/1997 | |
| JP | 10119827 A | * | 5/1998 | B62D/25/20 |
| JP | 2000168618 A | * | 6/2000 | B62D/21/15 |

\* cited by examiner

Primary Examiner—Lanna Mai  
Assistant Examiner—Paul Royal, Jr.  
(74) Attorney, Agent, or Firm—McDermott, Will & Emery

(57) ABSTRACT

A vehicle structure has a floor panel, a propeller shaft, a guide flange, and a stay. The floor panel is divided into a pair of side walls along the longitudinal direction of the vehicle. The propeller shaft is disposed within the floor panel, and has a joint at an intermediate position thereof. Motive power from an engine is transmitted via the propeller shaft. The guide flange is fixed to an outer peripheral surface of the propeller shaft in a region near the joint. The stay is disposed to the rear of the guide flange, and links the side walls of the propeller shaft. When the propeller shaft moves rearward, the guide flange interferes with the stay.

19 Claims, 6 Drawing Sheets

VEHICLE MOTIVE POWER TRANSMISSION STRUCTURE

The content of Application No. TOKUGANHEI 11-093384 which was filed in Japan on Mar. 31, 1999 and on which the claim to priority for this application is based, is hereby incorporated by reference.

BACKGROUND OF THE INVENTION

The present invention relates to a motive power transmission structure for a vehicle.

In a front-engine, rear-drive vehicle, motive power from the engine disposed in an engine compartment is transmitted to the final drive unit at the rear of the vehicle via a propeller shaft within the floor tunnel, so as to drive the rear wheels (refer to Japanese Laid-Open Patent Application publication H9-300996).

SUMMARY OF THE INVENTION

In general, at a front-end collision of a vehicle, the decrease in a deceleration of a cabin increases the protection provided to the occupants of the vehicle. To decrease the deceleration of the cabin, it is necessary to decrease a reaction force by bending the propeller shaft, particularly in a front-engine, rear-drive vehicle.

If the bending deflection of the propeller shaft is unstable, however, there is a chance that the propeller shaft interferes the floor tunnel, the bending amount of the propeller shaft is limited, whereby the cabin is not decelerated sufficiently.

When the floor panel exhibits broadening deformation due to a front-end collision, the positions of the seatbelt attachment points on the floor panel move, which might affect the restraining of occupants by the seatbelts. The distortion of the floor panel can be prevented by making the floor panel thick, although this leads to an increase in the weight of the vehicle.

Accordingly, it is an object of the present invention to provide a motive power transmission structure for a vehicle, wherein when a front-end collision occurs, the propeller shaft exhibits stable bending deformation with an aiming mode, and the broadening deformation of the floor panel is reliably prevented.

To achieve the above-noted object, the present invention has a front panel, a propeller shaft, a protrusion, and a stay. The floor panel is defined by a pair of side walls parallel along the longitudinal direction of the vehicle. The propeller shaft is disposed within the floor panel, and has an intermediate joint therewithin. Motive power from the engine is transmitted via the propeller shaft. The protrusion is fixed to the outer peripheral surface of the propeller shaft, in the region of the joint. The stay is disposed to the rear of the protrusion, and provides a link between the side walls of the floor panel. The protrusion interferes with the stay when the propeller shaft moves rearward, or the stay interferes the protrusion when moves forward.

DESCRIPTION OF THE PREFERRED EMBODIMENTS

Figure 1:
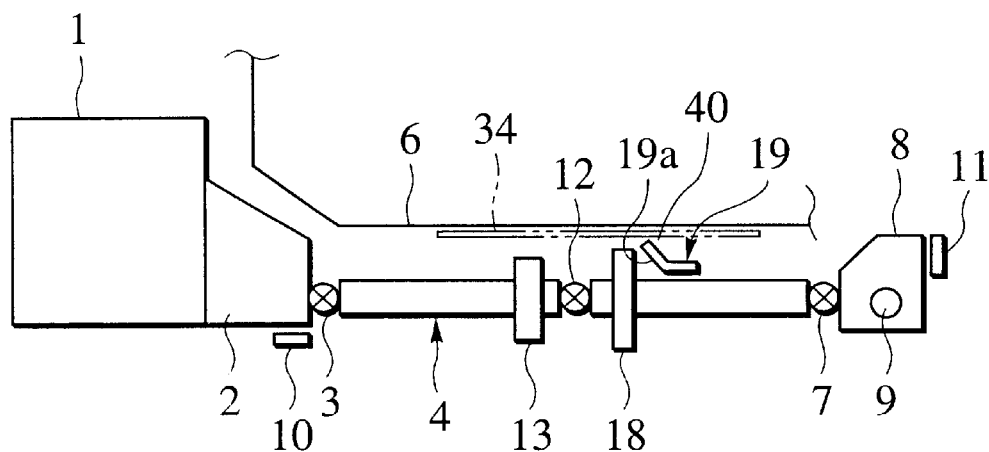
FIG. 1 is a side view showing a propeller shaft according to the first embodiment of the present invention.

Embodiments of the present invention are described in detail below, with reference made to relevant accompanying drawings.

As shown in FIGS. 1 to 5, a first embodiment of the present invention relates to a front-engine, rear-drive type of vehicle, in which an engine 1 is disposed within an engine compartment at the front part of the vehicle. A transmission 2 is dispose to the rear of the engine 1, and a propeller shaft 4 extends rearward from the transmission 2, via a front joint 3.

The propeller shaft 4 is disposed within a floor tunnel 6 of a floor panel 5. The floor tunnel 6 is formed by bending upward from floor panel 5, and has a pair of opposing side walls 6a, along the longitudinal direction of the vehicle, and an upper wall 6b between the upper ends of the side walls 6a.

Figure 2:
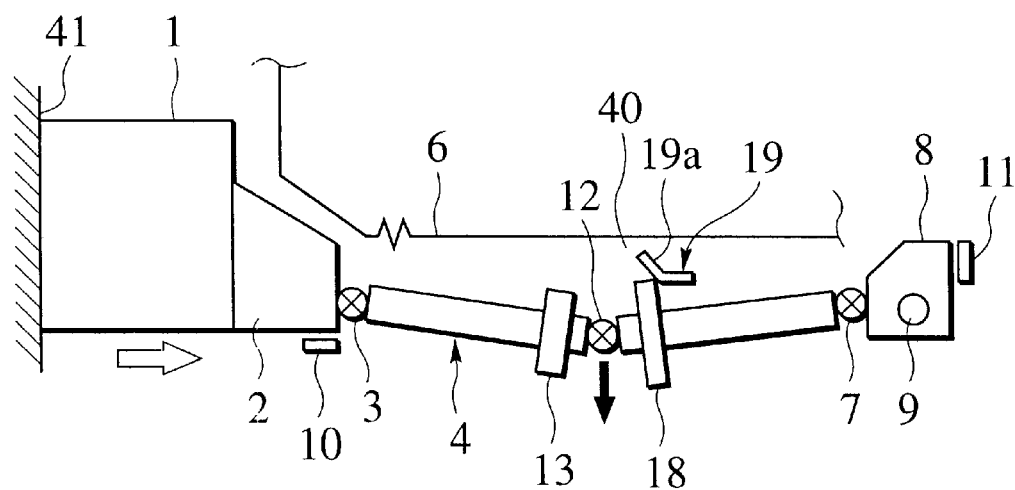
FIG. 2 is a side view showing the propeller shaft of FIG. 1 at the time of a front-end collision.
Figure 3:
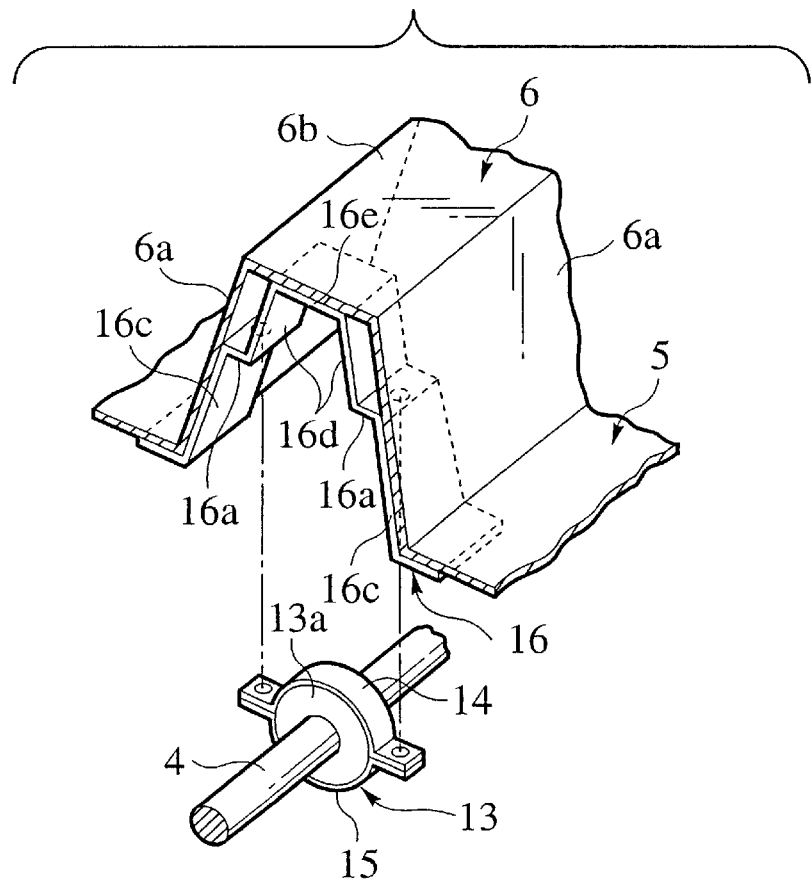
FIG. 3 is a perspective view showing the center bearing of FIG. 1.
Figure 4:
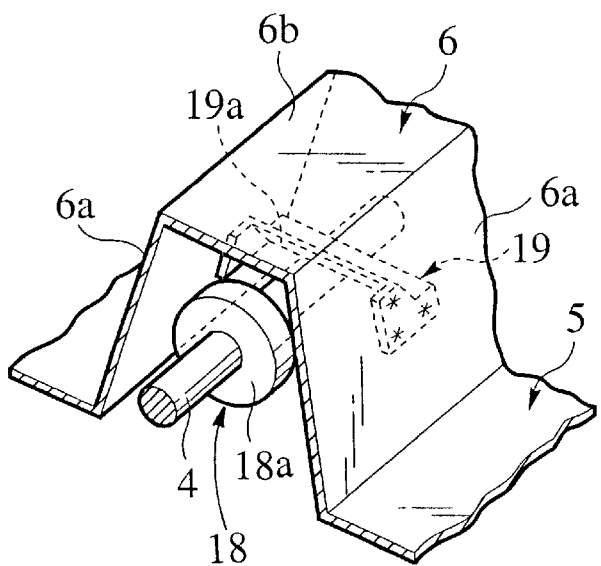
FIG. 4 is a perspective view showing the guide flange and stay of FIG. 1.
Figure 5:
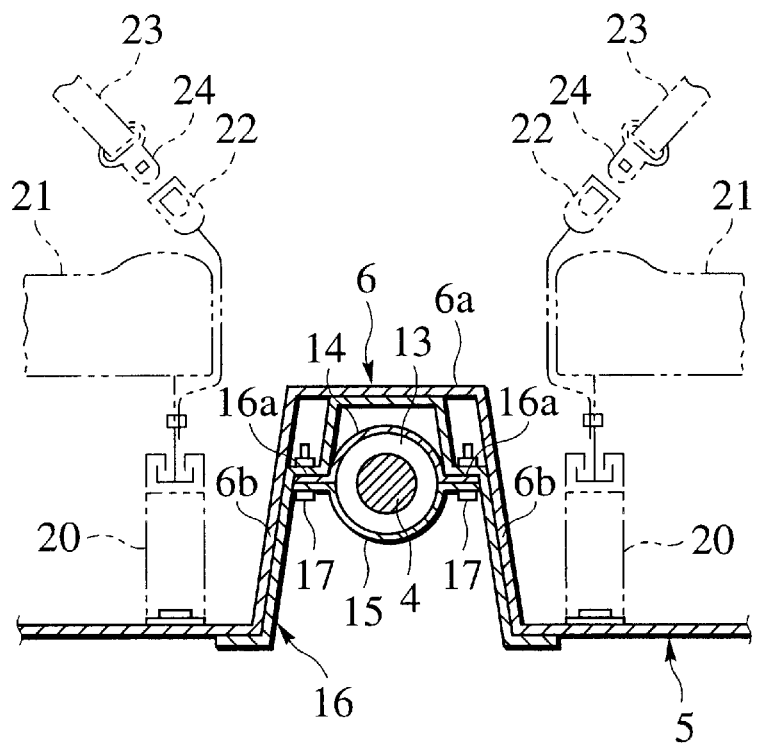
FIG. 5 is a cross-section view showing the floor panel of FIG. 1.

The rear end of the propeller shaft 4 is linked via a rear joint 7 to a final drive unit 8 at the rear part of the vehicle. Motive power of the engine 1 is transmitted via the propeller shaft 4 to the final drive unit 8, this being used by the final drive unit 8 to rotate the axle 9 of the rear wheels. In FIGS. 1 and 2, the reference numeral 10 denotes a first cross member, and the numeral 11 demotes a rear cross member.

A center bearing 13, a joint 12, and a guide flange 18 acting as a protrusion are provided midway on the propeller shaft 4.

The center bearing 13 is disposed near the front of the joint 12, and rotatably links the propeller shaft 4 to the floor panel 4. The center bearing 13 has a bearing body 13a on the outer peripheral surface of the propeller shaft 4 and top and bottom brackets 14 and 15 that surround and support the bearing body 13a. A reinforcement member 16 is disposed within the floor panel 6. This reinforcement member 16 has a lower walls 16c joined to inner surfaces of the side walls 6a, intermediate supporting walls 16a bent horizontally inward from the lower walls 16c, upper walls 16d bent upwardly from the inside edges of the intermediate supporting walls 16a, and an upper wall 16e between the upper edges of the upper walls 16a joined to the lower support of the upper wall 6b of the floor panel 6. The brackets 14 and 15 are joined together with the intermediate supporting walls 16a of the reinforcement member 16 by a bolt and nut 17. Because the brackets 14 and 15 are mounted to the reinforcement member 16 joined to the inner surface of the floor panel 6, the brackets improve the support rigidity of the center bearing 13.

The guide flange 18 has a rib protrusion 18a that is formed partially and integrally over the outer periphery of the outer peripheral surface of the propeller shaft 4, and is disposed in the region of the joint 12.

The stay 19 is disposed in the region to the rear of the guide flange 18, and links between the side walls 6a above the propeller shaft 4. The stay 19 can be fused to the side walls 6a, and can alternately be joined thereto by a bolt and nut. The stay 19 has an inclined surface 19a that is inclined toward the rear, in opposition to the guide flange 18. A horizontal extension line from the top edge of the guide flange 18 intersects with the inclined surface 19a and, when the propeller shaft 4 moves rearward or the stay 19 moves forward because of a front-end collision of the vehicle, the top edge of the guide flange 18 interferes with the inclined surface 19a.

The stay 19 is disposed at a distance from the upper wall 6b of the floor panel 6, with a gap 40 being formed between the stay 19 and the upper wall 6b. A parking brake cable 34 that is disposed at the front and rear of the vehicle body passes through the gap 40. It is therefore not necessary to provide a separate passageway for the parking brake cable 34, thereby enabling a simplification of the cable passageway. The gap 40 can also be used to pass other elements than the parking brake cable 34, such as a wiring harness for electrical equipment.

Front seats 21 are disposed to the left and right of the floor panel 6 in the region near the center bearing 13. The front seat 31 is supported slidably in the longitudinal direction of the vehicle by a slide rail 20 on the floor panel 5. A buckle 22 engageable with a tang is fixed to the front seat 21, and the seatbelt 23 is passed through a tang 24. The load applied to the seatbelt 23, therefore, is transmitted via the buckle 22 so that it is received by the front seat 21.

The operation when the vehicle experiences a front-end collision with a barrier surface 41 is as follows.

When the vehicle collides with the barrier surface 41, the engine is pushed rearward, and the propeller shaft 4 retracts. When the propeller shaft 4 retracts, the brackets 14 and 15 are ruptured, and the center bearing is placed in the free condition, as the upper edge of the guide flange 18 interferes with the inclined surface 19a of the stay 19. Because of this interference, the upper edge of the guide flange 18 moves comes into sliding contact with the inclined surface 19a. As a result, the guide flange 18 moves downward, as does the joint 12, the thrust force on the propeller shaft 4 being removed, so that the propeller shaft 4 reliably bends downward at the joint 12. Because there is nothing to interfere with the propeller shaft 4 bending downward, the bending angle of the propeller shaft 4 increases, and the distance between the front and rear joints 3 and 7 is greatly reduced. A large crushing of the front part of the cabin is, therefore, allowed, thereby decreasing the. deceleration of the cabin, and increasing the protection of occupants in the vehicle.

Because the bending direction of the propeller shaft 4 is limited to downward, interference of the propeller shaft 4 with the floor panel 6 and the resulting raising of the floor panel 6 are reliably prevented. Thus, there is no change in the position of the buckle 22, which is the fixing point for the seatbelt 23, so that there is no influence on the occupant restraint provided by the seatbelt 23.

Even if the brackets 14 and 15 rupture, the stay 19 that provides a link between the side walls 6a of the floor panel 6 prevents opening deformation of the floor panel 6. That is, because the stay 19 does not directly supports the propeller shaft 4, even if the propeller shaft 4 retracts when a collision occurs, the stay 19 does not rupture, and opening deformation of the floor panel 6 is reliably prevented. This behavior also prevents movement of the position of the buckle 22 and does not influence the restraint of occupants by the seat belt 23.

The guide flange 18 and the stay 19 can be provided at arbitrary positions on the propeller shaft 4 and the floor panel 6, respectively, and can be provided at any positions at which they do not mutually interfere. It is therefore possible to establish a position that is effective for having the propeller shaft 4 bend downward and also effective in preventing opening deformation of the floor panel 4 on the inclined surface 19a, which is the point at which these two elements interfere.

Additionally, because the stay 19 that links the walls 16a of the floor panel 6 suppresses vibration of the side walls 6a, there is the effect of suppressing noise and abnormal sounds when the vehicle is running.

Figure 6:
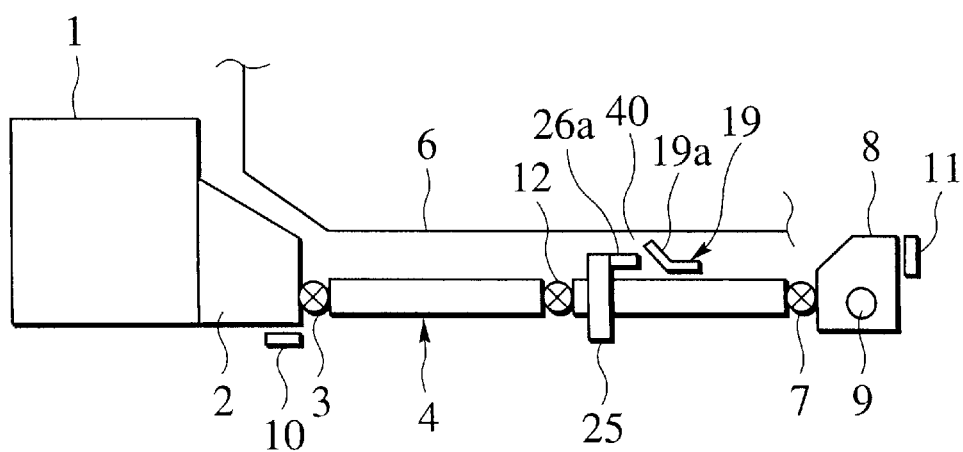
FIG. 6 is a cross-section view showing a propeller shaft according to the second embodiment of the present invention.
Figure 7:
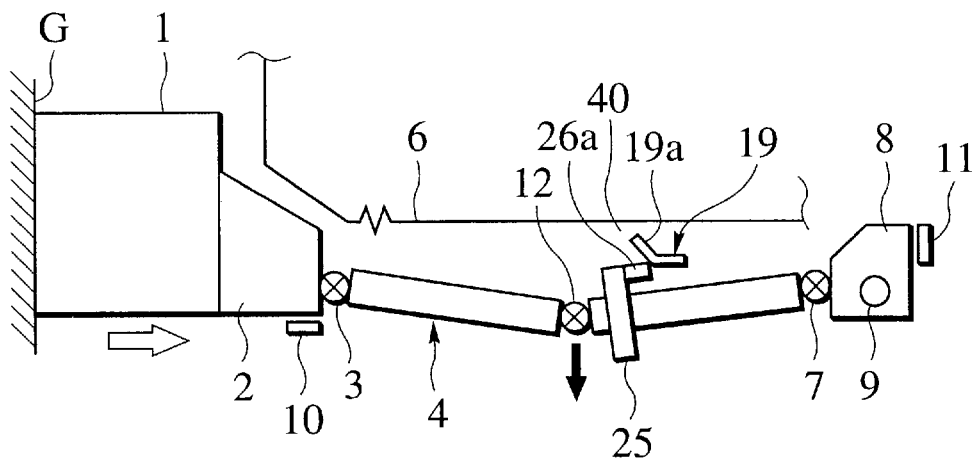
FIG. 7 is a side view showing the propeller shaft of FIG. 6 at the time of a front-end collision.
Figure 8:
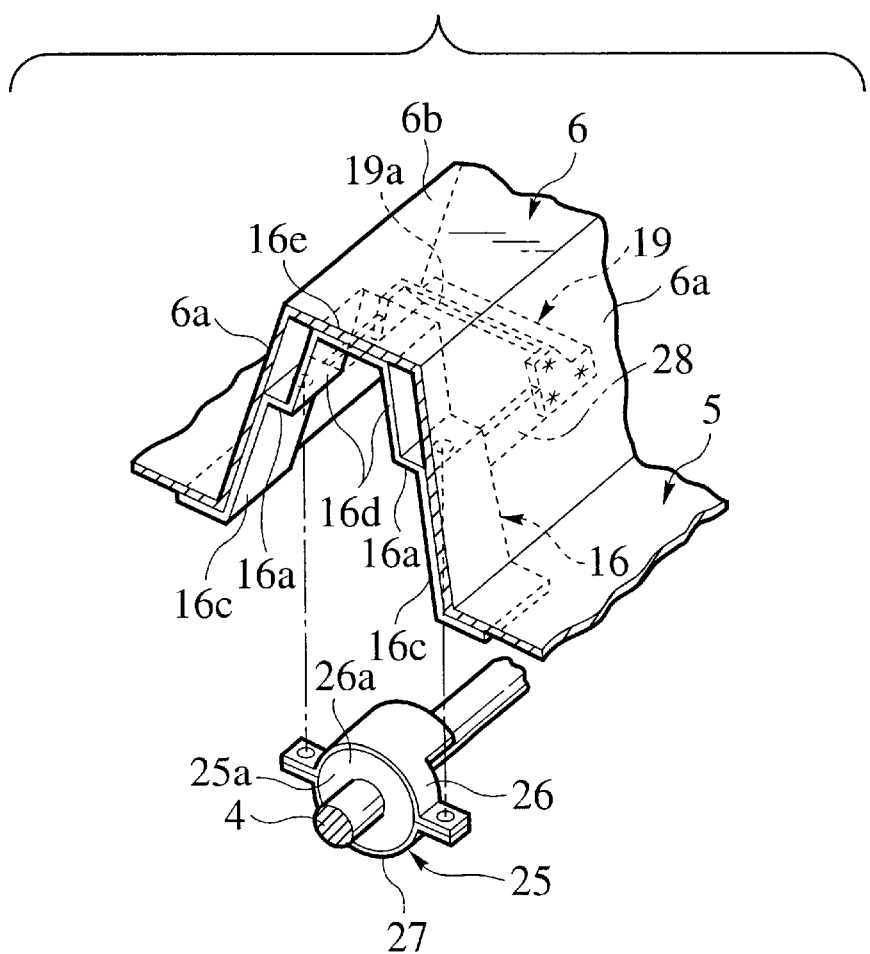
FIG. 8 is a perspective view showing the center bearing of FIG. 6.

As shown in FIGS. 6 to 8, which depict a second embodiment of the present invention, the second embodiment does not have the guide flange 18 of the first embodiment, and is provided with a center bearing 25 for use as a protrusion in place of the center bearing 13.

The center bearing 25 is disposed in a region to the rear of the joint 12, and rotatably links the propeller shaft 4 to the floor panel 4. The center bearing 25 has a bearing body 25a on the outer peripheral surface of the propeller shaft 4, and top and bottom brackets 26 and 27, which surround and support the bearing body 25a. The brackets 26 and 27 are joined to the intermediate supporting walls 16a of the reinforcement member 16 by a bolt and nut (not shown in the drawing).

In the same manner as in the first embodiment, a reinforcement member 16 and stay 19 are disposed within the floor panel 6. The stay 19 is disposed in a region to the rear of the reinforcement member 16. The upper bracket 26 has an extension 26a that extends rearward from the top edge thereof. A horizontal extension line from the extension 26a intersects with the inclined surface 19a and, when a vehicle collision causes the propeller shaft 4 to retract, the extension 26a interferes with the inclined surface 19a. The extension 26a enables the stay 19 to be disposed at a distance from the center bearing 25 and the reinforcement member 16.

In this embodiment of the present invention, even if the structure of the vehicle dictates that center bearing 25 and the stay 19 be disposed at a distance, because the rear edge of the extension 26a is near the inclined surface 19a, when a collision occurs the extension 26a reliably interferes with the inclined surface 19a. Thus, the extension 26a comes into sliding contact with the inclined surface 19a, thereby being guide downward, the center bearing 25 and joint 12 moving downward and the propeller shaft 4 bending reliably downward, so that the distance between the front and rear joints is greatly reduced.

Because the center bearing 25 generally used for supporting the propeller shaft 4 is made to function as a protrusion, there is no need to provide a separate protrusion, and no need, such as is the case in the first embodiment, to change the design of the propeller shaft 4.

Although in this embodiment of the present invention, the reinforcement member 16 and the stay 19 are formed separately, it is alternately possible, as shown by the double-dot-dash line in FIG. 8, to provide a connection part 28 between the reinforcement member 16 and the stay 19, so that they are integrally formed, and in by so doing, the number of parts is reduced. An additional advantage is that positioning of the reinforcement member 16 positions the stay 19 as well, thereby simplifying the position task.

Figure 9:
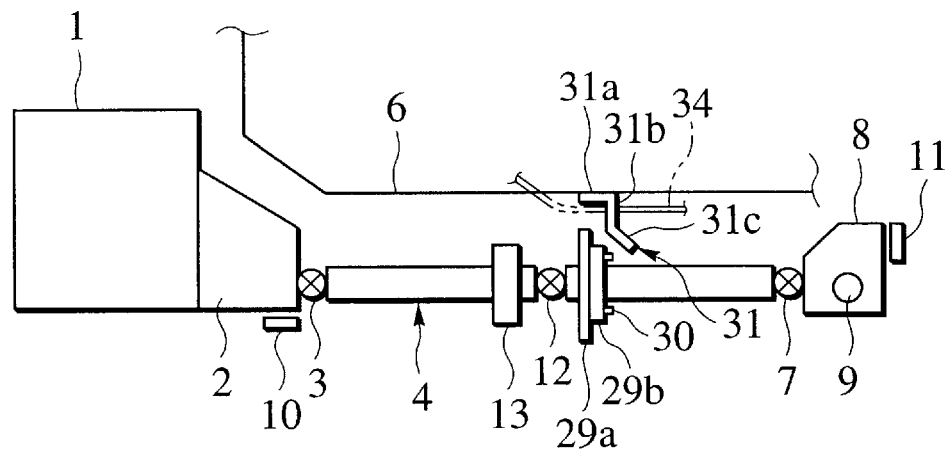
FIG. 9 is a side view showing a propeller shaft according to the third embodiment of the present invention.
Figure 10:
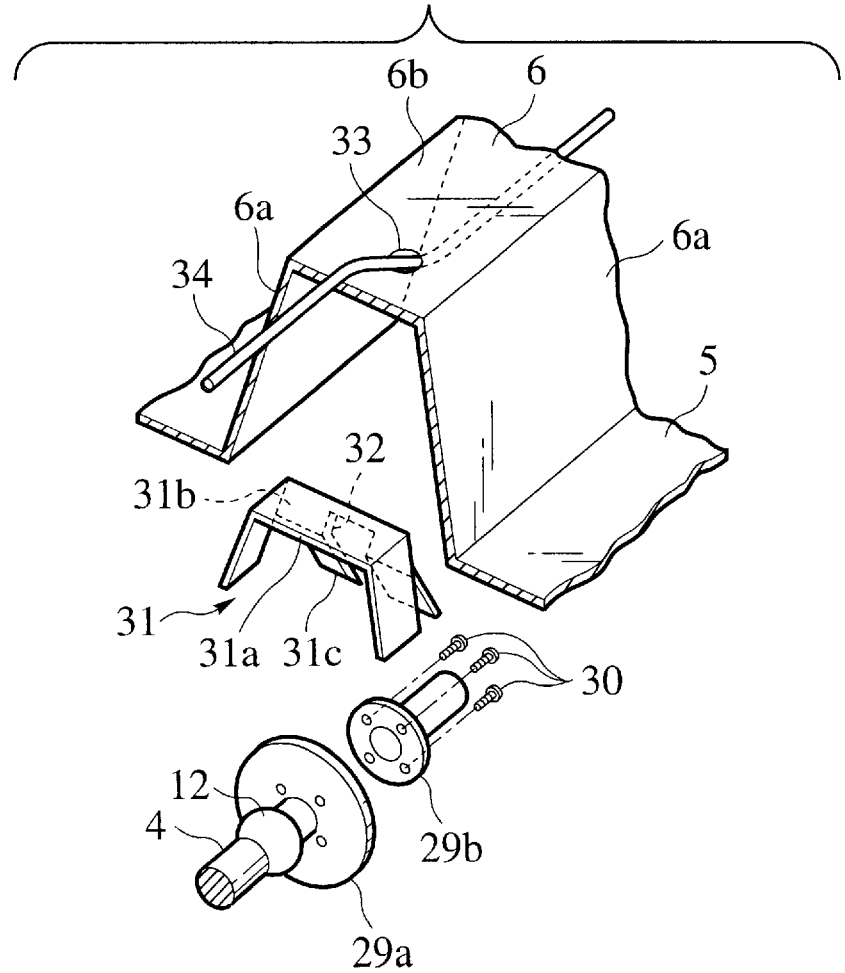
FIG. 10 is a perspective view showing the linking flange of FIG. 9.
Figure 11:
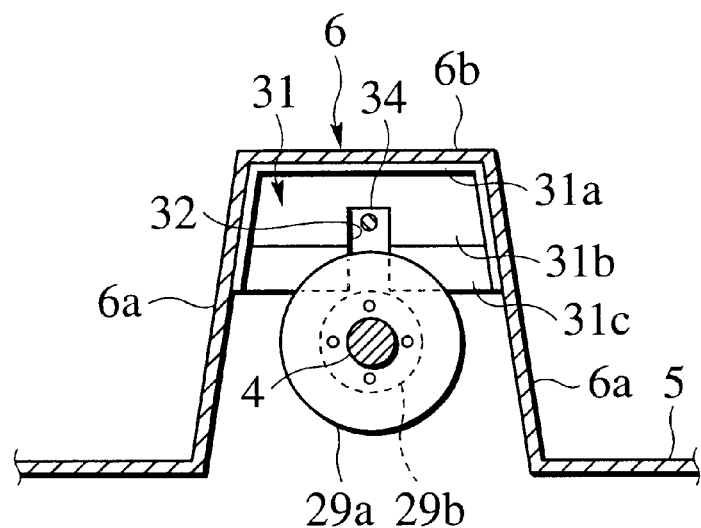
FIG. 11 is a cross-section view showing the floor panel of FIG. 9.

In a third embodiment of the present invention, as shown in FIGS. 9 to 11, there is no guide flange 18 such as provided in the first embodiment, and removable linking flanges 29a and 29b are provided at an intermediate position on the propeller shaft 4.

The linking flanges 29a and 29b are disposed in a region to the rear of the joint 12, and each of them is the shape of a disc that partially and integrally protrudes from the overall periphery of the outer peripheral surface of the propeller shaft 4. The diameter of the rear linking flange 29a as a protrusion is larger than that of the front linking flange 9b, and when these two flanges are linked the outer periphery of the rear linking flange 29a protrudes further outside than the front linking flange 29b. With the end surface of the linking flanges 29a and 29b in intimate contact with each other, they are connected to by a bolt 30.

The stay 31 s disposed in a region to the rear of the linking joints 29a and 29b and has an upper plate 31a that is joined to the bottom surface of the upper walls 6a of the floor panel 6, side plates 31d that are bend downward from both ends of the upper plate 31a and are joined to an inner surface of the side walls 6b of the front panel, a rear plate 31b that is bent perpendicularly from the rear edge of the upper plate 31a, and an inclined plate 31c that is bent to the rear and downward from the bottom edge of the rear plate 31b. A horizontal extension line from the upper edge of the front linking flange 29a intersects with the front surface of the inclined plate 31c which serves as an inclined surface and, when a vehicle collision causes the propeller shaft 4 to retract, the upper edge of the linking flange 29a reliably interferes with the inclined plate 31c.

The stay 31 has a cutout 32 as a passage part extending from the bottom edge of the inclined plate 31c to the rear plate 31b. The upper wall 6b of the floor panel 6 has a hole 33 at the front of the stay 31.

In this embodiment of the present invention, the parking brake cable 34 passes through the hole 33 and is inserted inside the floor panel 6, passing then through the cutout 32 of the stay 31 and run thereafter to the parking brake at the rear wheels.

Thus, there is no need to establish a separate passageway for the parking brake cable 34, thereby simplifying the cable passageway and the construction.

Because the propeller shaft 4 is disconnectably linked, the linking flange 29a generally used can be made to function as a protrusion, thereby eliminating the need to provide a separate protrusion, and eliminating the need to change the design of the propeller shaft 4 as is done in the case of the first embodiment.

In place of the cutout 32, it is alternately possible to form a hole-shaped passageway part in the stay 31, and further possible to pass other elements through the cutout 32, such as a wiring harness for electrical equipment. Another alternate configuration that is possible is one in which the outer diameter of the rear linking flange 29b is formed so as to be larger than that of the forward linking flange 29a, so that the rear linking flange 29b is used as the protrusion.

Figure 12:
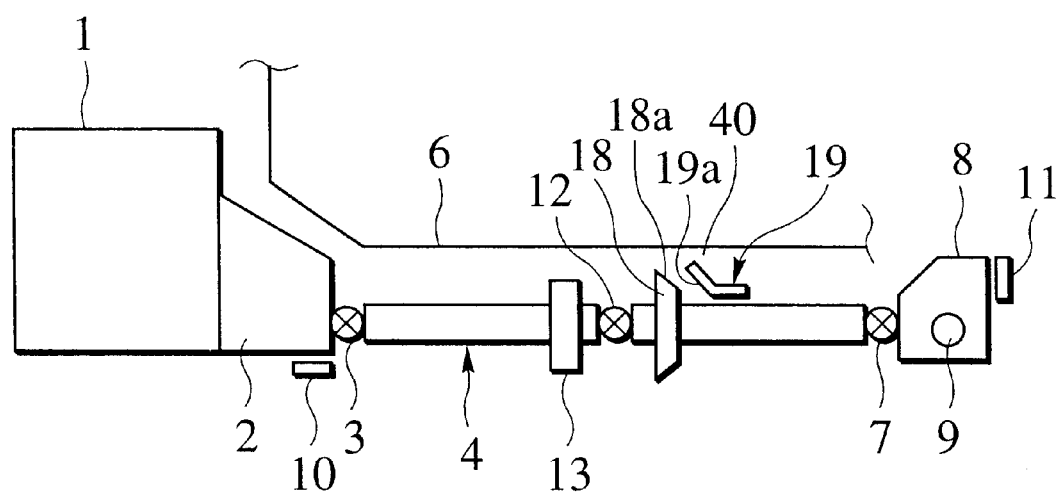
FIG. 12 is a side view showing a propeller shaft according to the fourth embodiment of the present invention.

In a fourth embodiment of the present invention as shown in FIG. 12, an inclined surface 18a, which is inclined downward toward the rear, is formed on the outer peripheral edge of the guide flange 18. The result of this is that, when a vehicle collision occurs, the inclined surface 18a of the guide flange 18 and the inclined surface 19a of the stay 19 mutually interfere, so that the guide flange 18 is more reliably guided downward. If an inclined surface 18a is formed on the guide flange 18, the inclined surface 19a need not necessarily be formed on the stay 19.

While the foregoing descriptions of embodiments of the present invention were for the example of application thereof to a front-engine rear-drive vehicle, it will be understood that the present invention can also be applied to a four-wheel-drive vehicle that has a propeller shaft between the engine 1 and the final drive unit 9.

What is claimed is:

1. A motive power transmission structure for a vehicle, comprising:
   a floor panel having opposing left and right side walls extending along a longitudinal direction of the vehicle body;
   a propeller shaft disposed within the floor panel and having in an intermediate position thereon a joint, whereby motive power from the engine is transmitted;
   a protrusion on an outer peripheral surface of the propeller shaft disposed in a region near the joint; and
   a stay disposed in rear of the protrusion and linking to the left and the right side walls of the floor panel, the protrusion interferes with the stay when the propeller shaft moves rearward.

2. A structure according to claim 1, wherein the protrusion interferes with the stay and restricts the movement direction of the joint.

3. A structure according to claim 1, wherein the stay is disposed above the propeller shaft.

4. A structure according to claim 1, wherein the protrusion is disposed in rear of the joint.

5. A structure according to claim 1, wherein at least one of the stay and the protrusion has an inclined surface whereby the protrusion is guided downward when the protrusion interferes with the stay.

6. A structure according to claim 1, wherein the protrusion comprises a rib-shaped guide flange protruding from the entire periphery of the outer peripheral surface.

7. A structure according to claim 1, wherein the protrusion comprises a center bearing rotatably linking the propeller shaft to the floor panel.

8. A structure according to claim 7, wherein the center bearing comprises a bearing body on an outer peripheral surface of the propeller shaft and a bracket linking the bearing body to the floor panel.

9. A structure according to claim 8, wherein the floor panel comprises a reinforcement element joined to an inner surface thereof, and wherein the bracket is linked to the reinforcement element.

10. A structure according to claim 9, wherein the stay and the reinforcement member are integrally formed.

11. A structure according to claim 1, wherein the propeller shaft comprises mutually disconnectable front and rear linking flanges at an intermediate position thereof, and wherein the protrusion is formed by at least one of the linking flanges.

12. A structure according to claim 1, wherein the stay is disposed at a distance from an upper wall of the floor panel.

13. A structure according to claim 1, wherein the stay has a passage part in the front-to-back direction.

14. A motive power transmission structure for a vehicle, comprising:
   a floor panel having opposing left and right side walls extending along a longitudinal direction of the vehicle body;
   a propeller shaft disposed within the floor panel and having in an intermediate position thereon a joint, whereby motive power from the engine is transmitted;

a protrusion on an outer peripheral surface of the propeller shaft disposed in a region near the joint; and a stay disposed in rear of the protrusion and linking to the left and the right side walls of the floor panel, the protrusion interferes with the stay when the propeller shaft moves rearward, wherein the protrusion comprises a center bearing rotatable linking the propeller shaft to the floor panel, the center bearing comprises a bearing body on an outer peripheral surface of the propeller shaft and a bracket body to the floor panel, and the bracket has an extension that extends rearward so as to interface with the stay.

15. A motive power transmission structure for a vehicle, comprising:

a floor panel having opposing left and right side walls extending along a longitudinal direction of the vehicle body;

a propeller shaft disposed within the floor panel, whereby motive power from the engine is transmitted to a final drive unit;

a protrusion on an outer peripheral surface of the propeller shaft; and a stay disposed in rear of the protrusion and linking to the left and the right side walls of the floor panel, the protrusion interferes with the stay so as to restrict the bending direction of the propeller shaft when the propeller shaft moves rearward.

16. A structure according to claim 15, wherein the protrusion and the stay are disposed above the propeller shaft.

17. A structure according to claim 15, wherein at least one of the stay and the protrusion has an inclined surface whereby the protrusion is guided downward when the protrusion interferes with the stay.

18. A structure according to claim 15, wherein the stay is disposed at a distance from a top edge of the floor panel.

19. A structure according to claim 15, wherein the stay has a passage part in the front-to-rear direction.

* * * * *